United States Patent
Reynolds et al.

(10) Patent No.: US 7,423,214 B2
(45) Date of Patent: Sep. 9, 2008

(54) SYSTEM AND METHOD FOR THE CREATION AND PLAYBACK OF ANIMATED, INTERPRETIVE, MUSICAL NOTATION AND AUDIO SYNCHRONIZED WITH THE RECORDED PERFORMANCE OF AN ORIGINAL ARTIST

(75) Inventors: Brian Reynolds, Hopewell (JM); William B. Hudak, Hebron, CT (US)

(73) Assignee: Family Systems, Ltd., Douglas, Isle of Man (GB)

( * ) Notice: Subject to any disclaimer, the term of this patent is extended or adjusted under 35 U.S.C. 154(b) by 775 days.

(21) Appl. No.: 11/084,548

(22) Filed: Mar. 18, 2005

(65) Prior Publication Data

US 2006/0032362 A1 Feb. 16, 2006

Related U.S. Application Data

(63) Continuation of application No. PCT/US03/29722, filed on Sep. 19, 2003.

(60) Provisional application No. 60/412,458, filed on Sep. 19, 2002.

(51) Int. Cl.
*G10H 7/00* (2006.01)

(52) U.S. Cl. .............................. 84/612; 84/601; 84/603; 84/609; 84/626

(58) Field of Classification Search ........................ None
See application file for complete search history.

(56) References Cited

U.S. PATENT DOCUMENTS

| | | | |
|---|---|---|---|
| 5,529,498 A * | 6/1996 | Cassily et al. ............... | 434/258 |
| 5,690,496 A | 11/1997 | Kennedy | |
| 6,052,717 A | 4/2000 | Reynolds et al. | |
| 6,542,869 B1 * | 4/2003 | Foote .......................... | 704/500 |
| 6,686,531 B1 | 2/2004 | Pennock et al. | |
| 6,703,549 B1 | 3/2004 | Nishimoto et al. | |
| 2004/0049539 A1 | 3/2004 | Reynolds et al. | |
| 2006/0293089 A1 * | 12/2006 | Herberger et al. ........... | 455/567 |
| 2007/0044643 A1 * | 3/2007 | Huffman ..................... | 84/625 |
| 2007/0287141 A1 * | 12/2007 | Milner ................... | 434/307 A |
| 2008/0013757 A1 * | 1/2008 | Carrier ....................... | 381/119 |
| 2008/0034948 A1 * | 2/2008 | Sumita ........................ | 84/636 |
| 2008/0072741 A1 * | 3/2008 | Ellis ........................... | 84/609 |
| 2008/0133576 A1 * | 6/2008 | Hempleman et al. ......... | 707/102 |

FOREIGN PATENT DOCUMENTS

WO 02/88909 2/2002

* cited by examiner

*Primary Examiner*—Marlon T Fletcher
(74) *Attorney, Agent, or Firm*—Ropes & Gray LLP; Jeffrey C. Aldridge

(57) ABSTRACT

A music application guides a user with some musical experience through the steps of creating and editing a musical enhancement file that enhances and plays in synchronicity with an audio signal of an original artist's recorded performance. This enables others, perhaps with lesser musical ability than the original artist, to play-along with the original artist by following melodic, chordal, rhythmic, and verbal prompts. The music application accounts for differences in the timing of the performance from a standard tempo by guiding the user through the process of creating a tempo map for the performance and by associating the tempo map with MIDI information of the enhancement file. Enhancements may contain MIDI information, audio signal information, and/or video signal information which may be played back in synchronicity with the recorded performance to provide an aural and visual aid to others playing-along who may have less musical experience.

60 Claims, 6 Drawing Sheets

SYSTEM AND METHOD FOR THE CREATION AND PLAYBACK OF ANIMATED, INTERPRETIVE, MUSICAL NOTATION AND AUDIO SYNCHRONIZED WITH THE RECORDED PERFORMANCE OF AN ORIGINAL ARTIST

CROSS-REFERENCE TO RELATED APPLICATION

This application is a continuation of International Application PCT/US03/29722, filed Sep. 19, 2003, which claims the benefit of U.S. provisional application No. 60/412,458, filed Sep. 19, 2002, each of which is hereby incorporated-by-reference herein in its entirety.

BACKGROUND OF THE INVENTION

This invention relates to educational applications and, more particularly, to musical educational applications for "playing-along" with a recorded musical performance. This promotes the enjoyment and appreciation of the recorded musical performance.

Utility software that allows users to create new musical works while incorporating previously recorded performances is well known. Illustrative commercially available utility software is provided, for example, by Sonar™ 2002 by Twelve Tone Systems, Inc. of 51 Melcher Street, Boston, Mass. Suitable hardware that may be used in implementing utility software such as Sonar™ 2002 may include a personal computer. This utility software allows a user to store and edit both Musical Instrument Digital Interface ("MIDI") commands and audio signals in order to create a single new musical work.

MIDI is a specification and protocol that can be used to communicate note and effect information between an electronic instrument and a personal computer loaded with the utility software described above, for example. An electronic instrument may simply be, for example, the personal computer's keyboard when the keyboard's buttons are assigned to particular musical notes. The basic MIDI command recorded by the utility software is a "note on/off" event which comprises a note number (pitch) and a key velocity (loudness). There are various other types of values that may be included in such a command, such as lyric text information and instrument specific events. No audible sound data is actually contained in the MIDI commands. Although it may be displayed visually (as described below), in order to hear the MIDI information, the user's computer must be equipped with a MIDI output device such as a keyboard's synthesizer, a sound card with or coupled to a built in synthesizer, a stand alone MIDI synthesis module, a "drum machine," MIDI software, or a combination thereof, for example.

Audio signals (i.e., "sounds"), on the other hand, are produced when a vibrating object excites air molecules in such a way to form coherent waves or a series of pressure gradients which may impinge on the eardrum. Using an audio signal musical input device, such as a transducer (i.e., a microphone), analog audio signals (or "sound waves") may be sampled by the utility software and stored as digital information on the computer. When this sort of information is stored in the user's computer, it may be referred to as digital audio. An example of an audio signal that may be stored by the user with the utility software described above is the performance of a singer. A microphone may convert the air pressure changes caused by the vibrations of the singer's vocal chords into voltage changes. These voltage changes may then be sampled and stored by the utility software onto the user's computer. The utility software stores this musical (i.e., audio) performance of the singer as digital audio rather than MIDI information. Moreover, previously recorded digital audio may be transferred from a compact disc ("CD") and stored by the utility software onto the user's computer through a "direct" line-in signal input device, for example, as opposed to a microphone.

Therefore, utility software may act as an audio and MIDI sequencer, allowing a user to piece together a new musical work with both MIDI component tracks and audio signal tracks (such as recorded vocals or guitar) that are both controlled by one internal clock source. Such software may provide various aural and visual representations of the tracks which better allow a user to edit and playback specific aspects of his or her composition. For example, MIDI information may be displayed as notation in staff view, guitar fret view, or as an event list, while digital audio information may be viewed as a continuous graph of the audio signal's amplitude over time. Furthermore, the MIDI information and digital audio information may be heard at various volumes, tempos, and pitches, for example.

However, because the tempo often varies during the real performance, there is no satisfactory application supported by such utility software that provides tools to assist and guide a user through the steps of creating, editing, and playing back enhancements to a recorded performance of an original artist in such a way that promotes the enjoyment and appreciation of the recorded performance. As a result, many people who have access to the type of utility software described above do not use it in their efforts to enjoy and learn how to play an original artist's recorded performance.

Accordingly, it would be desirable to provide a music application that guides a user through the steps of creating and editing visual and aural musical enhancements that play in synchronicity with a recorded performance of an original artist, and that prompts the user to "play-along" with the musical enhancements to promote the enjoyment and appreciation of the original artist's recorded performance without requiring possession of the performance itself, but that allows for playback in synchronicity with the recorded performance if he or she possesses it.

SUMMARY OF THE INVENTION

It is therefore an object of this invention to provide a music application that guides a user through the steps of creating and editing visual and aural musical enhancements that play in synchronicity with a recorded performance of an original artist.

It is therefore also an object of this invention to provide such a music application that prompts the user to "play-along" with the musical enhancements to promote the enjoyment and appreciation of the original artist's recorded without requiring possession of the performance itself, but that allows for playback in synchronicity with the recorded performance if he or she possesses it.

These and other objects of the invention are accomplished in accordance with the principles of the present invention by providing a music application that guides a user through the process for enhancing an audio signal. More specifically, the music application guides the user through the steps of creating and editing a musical enhancement file having visual and aural enhancements that play in synchronicity with a recorded performance of an original artist, and for prompting a user to "play-along" with the musical enhancement file to promote the enjoyment and appreciation of the original artist's recorded performance without requiring playback of the performance itself.

It is to be understood that a user who creates a musical enhancement file may be more knowledgeable about the intricacies of its associated recorded performance than another user who may just "play-along" with the enhancement file. The music application of the present invention is intended to be participatory in nature, by both the novice and the advanced enthusiast, in both the creation and use of musical enhancement files that are in synchronicity with recorded performances of original artists, as well as in the subsequent revisions of the files to add further details. It is also to be understood that the user may save a created enhancement file including the recorded performance, copyright laws permitting. A user may load a rightfully owned copy of the recorded performance into an already created enhancement file for that performance, or may play-along to the enhancements of the enhancement file without the performance.

The systems and methods of the present invention may be implemented using iBook technology, as described in commonly-assigned U.S. Pat. No. 6,052,717, which is hereby incorporated by reference herein in its entirety. IBook technology allows users to contribute original material (e.g., a musical work) and create derivations of the original material. The systems and methods of the present invention may also be implemented using the interactive web collaboration systems and methods of Reynolds et al. U.S. patent application Ser. No. 10/439,143, filed May 14, 2003, which is hereby incorporated by reference herein in its entirety. Reynolds et al. provides a framework and a space referred to as a topic room in which one or more individuals may collaborate on topics of mutual interest (e.g., music). In addition, the musical enhancement files of the present invention may be published and distributed using the systems and methods of Reynolds et al. PCT Publication No. WO 02/088909, filed Feb. 1, 2002, which is hereby incorporated by reference herein in its entirety.

In a preferred embodiment, the music application guides a user through the process of creating, editing, and/or "playing-along" with a musical enhancement file. A musical enhancement file may comprise aural and/or visual enhancements to a recorded performance of an original artist, and may be saved separately from the recorded performance or, if in agreement with copyright laws, bundled with the recorded performance. These enhancements may be the user's interpretations of the recorded performance's melodic, lyrical, and/or chordal structure. These enhancements may also be any other related aspect or accompaniment to the performance that the user desires to create. The music application may run a musical enhancement file in order to playback and present the visual and/or aural portions of its enhancements to the user in various ways and at various pitches and tempos. The musical enhancement file may be played at the same time as the recorded performance with which it is synchronized or it may be played by itself. One thing that distinguishes the presentation of the musical enhancements of the present invention from that of other media, such as Karaoke, is the fact that all of the various types of enhancements may be presented together and temporally synchronized with the original recorded performance.

These enhancements can be conventional MIDI information and/or digital audio and video information. When the music application provides playback of a musical enhancement file, a user is provided with educational opportunities to "play-along" with, experiment with, study, and appreciate the musical structure and nuances of not only the recorded performance but also its enhancements. Throughout this application, the term "play-along" refers to the many ways in which a user may play an instrument, sing, or just visually follow along with one or more enhancements created with the music application of the present invention. For example, some of the enhancements may be displayed visually while the user listens to the synchronized original recorded performance. Alternatively, all of the enhancements may be displayed visually while the user only listens to a particular enhancement and not the recorded performance, for example.

Time-stable pitch variation of the enhancements and the recorded performance in synch with one another may add significant poignancy and/or accessibility to the subject matter by enabling a user to play-along with the performance in a different pitch more suitable to the range of their voice or instrument. Furthermore, pitch-stable speed variation of the enhancements and the recorded performance may enable a user to play-along with the performance at a different speed more suitable to their abilities.

A preferred process of the music application of the present invention allows a user, who may not be a musician but who is interested in playing a song, to play-along with a musical enhancement file in synchronicity with the original artist's recorded performance of that song with which the user is familiar. For example, the application may display the visual portions of the enhancements in the form of animated sheet music. This animated sheet music display may have chording symbols or tablature, a musical stave representing the melody, and a line of lyrical text stacked vertically on top of each other and highlighted by a time cursor which scrolls over them with typically two measures displayed at a time (see, e.g., FIG. 5) along with an optional leading measure and trailing measure. As the performance progresses, the measures may shift to the left so that the cursor may remain in the two central measures displayed, while the cursor continues to highlight the enhancements in synchronicity with the performance which may be aurally presented to the user. Alternatively, the cursor may remain fixed, substantially to left-most portion of the display, while the visual portions of the enhancements continuously scroll through the cursor from right to left, for example. Moreover, there may be two rows of these selected enhancements stacked vertically, so that once the cursor has scrolled to the end of the top row, it may jump down and begin to scroll through the bottom row while the top row is replaced with the next row of enhancements that follows the row presently being scrolled. With this enhancement file, and the ability to manipulate the display and playback of the enhancements, users may be prompted to play-along while not only listening to but also "seeing" the music or other notations representing various intricacies of their favorite songs as performed by their favorite artists.

BRIEF DESCRIPTION OF THE DRAWINGS

The above and other advantages of the invention will be more apparent upon consideration of the following detailed description, taken in conjunction with the accompanying drawings, in which like reference characters refer to like parts throughout, and in which.

DETAILED DESCRIPTION OF THE INVENTION

Figure 1:
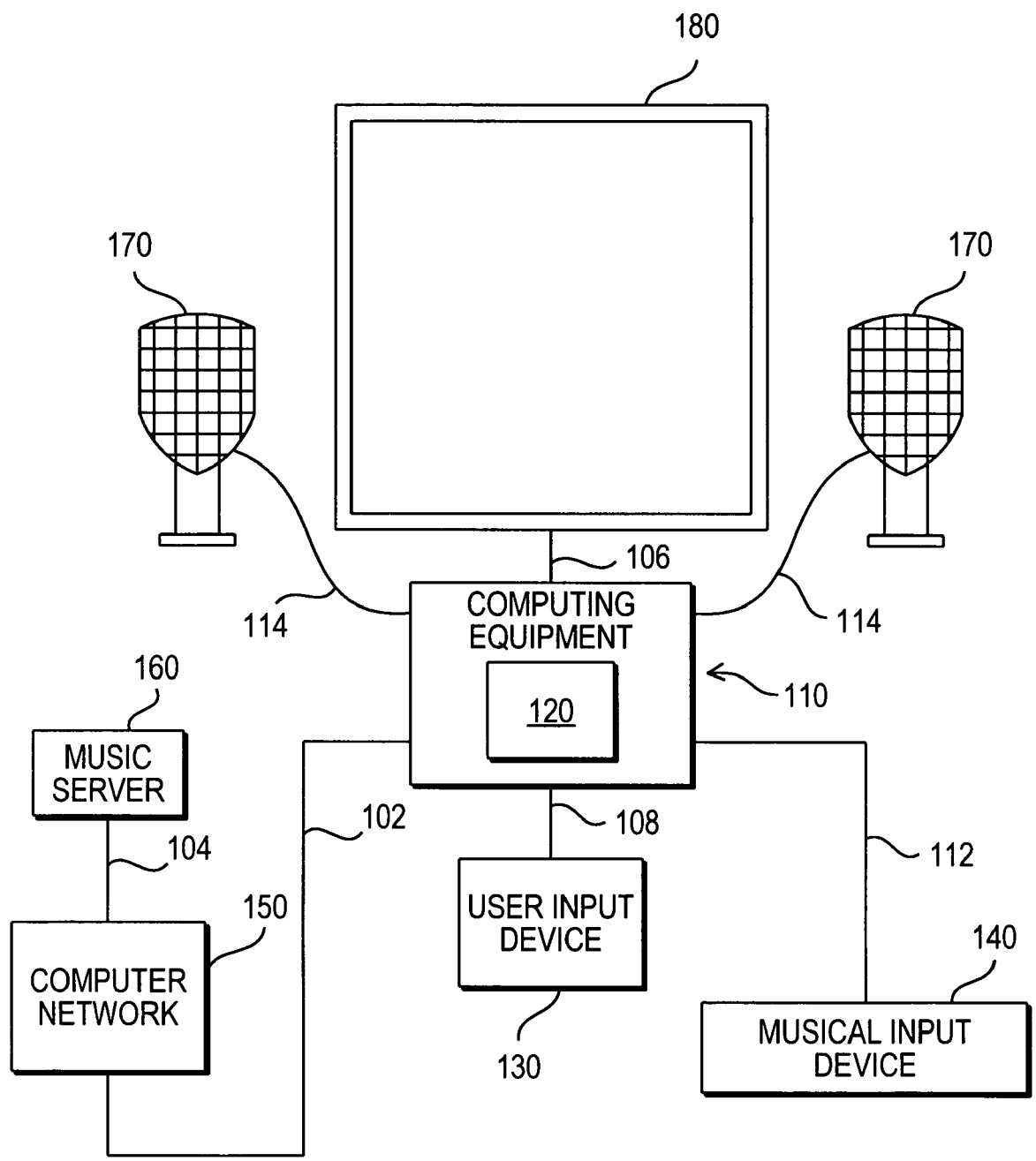
FIG. 1 shows a diagram of a system suitable for implementation of a music application in accordance with the present invention.

FIG. 1 illustrates a musical system 100 suitable for implementation of a music application in accordance with the present invention. System 100 may include user computing equipment 110 that is connected by one or more communication links 102 to a computer network 150. System 100 may include music server 160 that is connected by one or more communication links 104 to computer network 150.

The music application, implemented on system 100, may guide a user through enhancing a performance signal. In one suitable approach, the music application may run on computing equipment. Computing equipment, such as computing equipment 110, may be a computer, personal computer, laptop computer, handheld computer, personal digital assistant, computer terminal, any other suitable computing device, or a combination of such devices. Computing equipment 110 may include memory and storage device 120 in which utility software and data files of the music application may be loaded and saved. Memory and storage device 120 may have communications, memory, and processing circuitry suitable for supporting functions such as accessing the music application over links 102.

In another suitable approach, the music application may run using a client-server or distributed architecture where a portion of the music application may be implemented locally on the computing equipment in the form of, for example, a client process. Another portion of the music application may be implemented at a remote location, such as on music server 160 or any other suitable equipment as, for example, a server process. A server such as music server 160 may be any suitable server, processor, computer, data processing device, or a combination of such devices. In one example, music server 160 may be a web server powered by Family Systems' iBook System. These arrangements are merely illustrative. Any other suitable arrangement for implementing the music application may be used.

A user may interact with computing equipment 110 for selecting operations and manipulating text and graphics of the music application's graphical user interface ("GUI") using any suitable user input device 130, such as a keyboard, a wireless keyboard, a mouse, a trackball, a touch pad, or any other suitable input device. User input device 130 may be connected by one or more communication links 108 to computing equipment 110.

A user may input any musical information to computing equipment 110 for storing recorded performances and/or creating musical enhancements using musical input device 140, which may be any MIDI-enabled instrument, such as a guitar or keyboard synthesizer, a microphone, a CD player, a digital video disc ("DVD") player, video camera, or any other suitable musical input device for inputting MIDI information and audio and/or video signal information for creating enhancements and for loading performance signals. Musical input device 140 may be connected by one or more communication links 112 to computing equipment 110.

MIDI information and audio signal information associated with the music application may be played back as audible sound to a user using an aural speaker device 170 that is connected by one or more communication links 114 to computing equipment 110 that is equipped with a MIDI enabled sound card. Aural speaker device 170 may be a pair of stereo speakers, headphones, or any other suitable aural speaker equipment.

Text, graphics, and video signal information associated with the music application may be presented to a user using a visual display device 180 that is connected by one or more communication links 106 to computing equipment 110. Visual display device 180 may be a computer monitor, a handheld computer display, a laptop computer display, a personal digital assistant display, or any other suitable display device.

Computer network 150 may be a hub linking computing equipment 110 and music server 160. Music server 160 may be connected to computer network 150 by one or more communication links 104. Computer network 150 may be any suitable computer network including the Internet, an Intranet, a wide-area network (WAN), a local-area network (LAN), a wireless network, a digital subscriber line (DSL) network, a frame relay network, an asynchronous transfer mode (ATM) network, a virtual private network (VPN), or a combination of such networks.

The components of system 100 may be interconnected using various communications links, such as links 102, 104, 106, 108, 112, and 114. These communications links may include satellite paths, coaxial cable paths, fiber-optic paths, twisted pair paths, other wire or cable-based links, modems, wireless paths through free space, any other suitable paths, or a combination of such paths. Communications over communications links such as links 102, 104, 106, 108, 112, and 114 may involve analog transmissions, digital transmissions, wireless transmissions, microwave transmissions, radio-frequency transmissions, optical transmissions, audio transmissions, any other suitable type of transmissions, or a combination of such transmissions. Communications may involve Internet transmissions, private network transmissions, packet-based transmissions, television channel transmissions, transmissions in the vertical blanking interval (VBI) of a television channel or on a television sideband, MPEG transmissions, MIDI information transmissions, or any other suitable type of transmissions. Communications may involve wireless pager or other messaging transmissions. These communications links may include cable connected to cable modems, digital subscriber lines, integrated services digital network (ISDN) lines, or any other suitable paths.

Users at user computing equipment 110 may participate in enhancing a performance signal by interacting with the music application. The music application may provide a user at computing equipment 110 with screens containing various application information on visual display device 180. For example, the user may be presented with screens that allow the user to create musical enhancements, view, edit, and play-along with enhancement information, or any other suitable screen in connection with the application.

The music application may provide the user with interactive screens containing menus and selectable options that allow the user to navigate through the music application and participate in the music application. With user computing equipment 110, the user may use a keyboard, mouse, trackball, touch pad, or other suitable input or pointing device to navigate the various menus and selectable options.

The user may access the music application with user computing equipment 110. The user may access the music application by browsing to an Internet web site or a site on a private network, by running a local program, or by any other suitable method.

A music application for creating, editing, and playing-along with a musical enhancement file having visual and aural enhancements that play in synchronicity with a recorded performance and methods of use are provided. Users may be individual musicians, conductors, symphonies, directors, or any other suitable entity that desires to enhance a performance.

Figure 2:
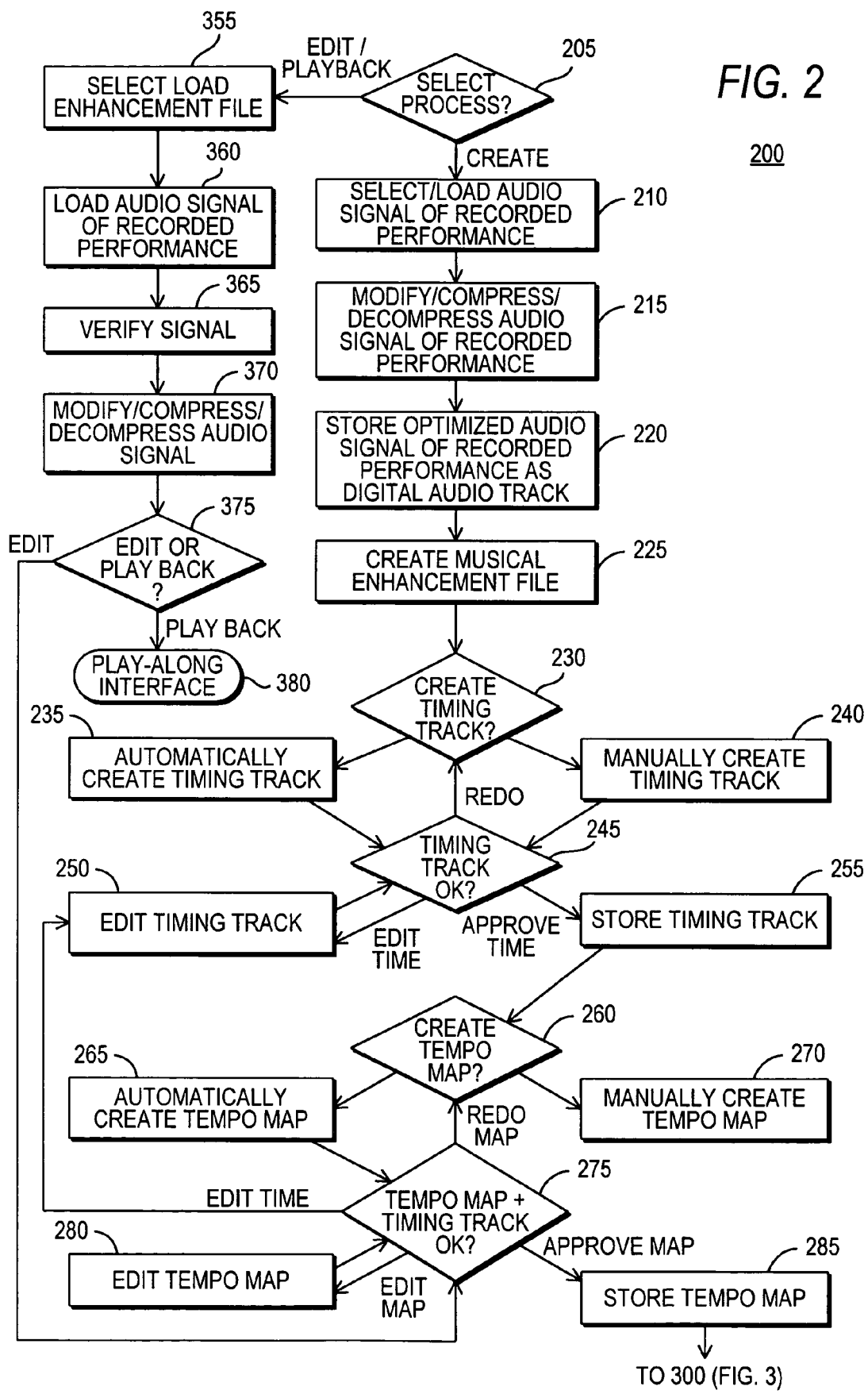
FIGS. 2 and 3 together form a flow chart of exemplary processes of the music application in accordance with the present invention.
Figure 3:
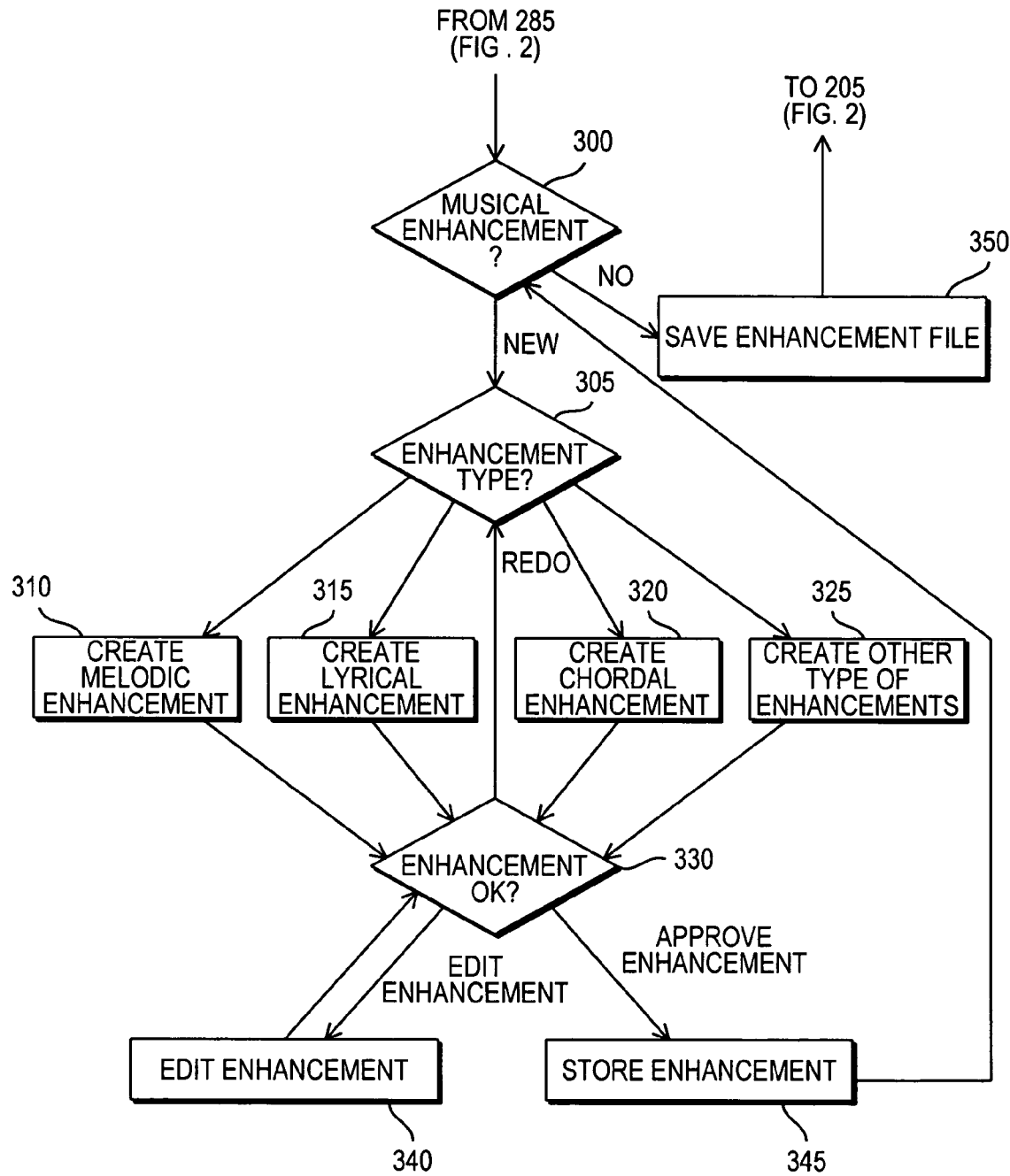

FIGS. 2 and 3 together show a flow chart 200 of exemplary processes of the music application of the present invention applied to a system such as musical system 100 of FIG. 1 for guiding a user to create, edit, and play-along with a musical enhancement file of an audio signal of an original artist's recorded performance. Some or all of the steps may be performed.

If the user desires to create a new musical enhancement file, the user may begin the creation process at step 205 (e.g., by clicking on an icon labeled "create new enhancement file"). The music application may then prompt the user at step 210 to select and load the audio signal of an original artist's recorded performance on which the new enhancement file is to be based. This audio signal may be loaded from any compatible audio source, such as a CD, DVD, computer hard drive, or web site, for example, in any suitable format, such as windows wave ("WAV") or moving picture experts group layer-3 ("MP3"), for example, via musical input device 140 or music server 160 via computer network 150 (FIG. 1). At step 215, the music application may modify and/or compress/decompress the contents of the loaded audio signal into a standardized file format (e.g., WAV or MP3) in order to optimize the suitability of the digital audio information for further processes, if necessary. Then, at step 220, the music application may store the recorded performance as an optimized digital audio track.

After the music application has loaded and modified/compressed the recorded performance's audio signal, it may prompt the user to generate a musical enhancement file at step 225. The musical enhancement file may be based on current MIDI specifications and include the digital audio track of the already loaded and modified audio signal of the recorded performance. The enhancement file may also contain additional data to optimize its suitability for further processes, such as providing a framework for storing MIDI information and audio/video signal information (e.g., video of a musician playing-along with the recorded performance) in additional tracks that are linked to the performance signal track.

At step 230, the music application may prompt the user whether to manually or automatically create a "timing track." A timing track integrates the recorded performance's tempo, which may vary throughout the course of the song, with an internal clock source of computing equipment 110 (FIG. 1). If the user chooses for the timing track to be created automatically (e.g., by clicking on an appropriate icon) at step 230, the music application may generate the timing track by associating certain peaks of the recorded performance's audio signal with its inherent sample timing, for example, at step 235. Alternatively, if the user chooses to manually create the timing track at step 230, the music application may prompt the user at step 240 to rhythmically tap out beats in accordance with the tempo of the recorded performance's audio signal as it progresses from beginning to end. This may be accomplished in a plurality of ways, some of which may require the user to tap out beats using a computer keyboard or mouse via user input device 130 or an instrument via musical input device 140, for example. The music application can discern the beats tapped out by the user and associate them with a specific sample number within the related recorded performance's audio signal, or it can directly integrate the beats into the appropriate MIDI data bits.

At step 245, the music application may prompt the user to approve, edit, or redo the created timing track. If the user chooses to redo the timing track at step 245, the music application returns to step 230. If the user chooses to edit the timing track at step 245, a number of various editing options are provided by the music application at step 250, including playback of both the aural and visual portions of the recorded performance's audio signal in synchronicity with the newly created timing track to assist the user in any necessary further refinement or correction. Editing of the timing track may be done by manual or automatic means until the user and/or the music application is satisfied that valid data has been created. For example, upon playback, certain deviations from the tempo of the artist's recorded performance may be discerned in the timing track. In this case, the user may wish to edit these imperfections manually by "sliding" the position of a beat with a mouse or by entering a specific time code position, for example. Alternatively, the music application may automatically discern inconsistencies in the timing track and automatically quantize the frequency of the beats, for example. Once the user is satisfied with the integrity of the timing track and chooses to approve it at step 245, the music application stores the timing track in the musical enhancement file at step 255.

Next, at step 260, the music application may prompt the user whether to manually or automatically create a "MIDI tempo map" for the beats of the timing track. A tempo map may appropriately vary the relationship between the music application's MIDI information (e.g., the MIDI information of the timing track) and the music application's digital signal information (e.g., the signal information of the recorded performance) to maintain the beat and measure boundaries of MIDI information tracks in synchronicity with the boundaries of the original recorded performance, for example. Measure boundaries may be assigned using conventional musical notation, such as time signature, to specify the number of beats per measure and the note value of each beat in the timing track. The tempo map may assign multiple time signatures throughout the timing track in view of the fact that meter, in addition to tempo, may vary throughout the course of a musical performance, and thus throughout the timing track. If the user chooses for the tempo map to be created automatically (e.g., by clicking on an appropriate icon) at step 260, the music application may generate the tempo map by assigning one or more time signatures to the timing track, and thus the musical enhancement file, for example, at step 265. Alternatively, if the user chooses to manually create the tempo map (e.g., by clicking on an appropriate icon) at step 260, the music application may prompt the user, at step 270, to assign one or more time signatures to the timing track such that certain numbers of beats of the timing track and their time values in a measure may define a specific rhythm of the recorded performance, for example.

At step 275, the music application may prompt the user to edit the created timing track or to approve, edit, or redo the created tempo map. If the user chooses to edit the timing track at step 275, the music application returns to step 250. If the user chooses to redo the tempo map at step 275, the music application returns to step 260. If the user chooses to edit the tempo map at step 275, a number of various editing options may be provided by the music application at step 280, including playback of both the aural and visual portions of the recorded performance's audio signal in synchronicity with the timing track and newly created tempo map to assist the user in any necessary further refinement or correction. Editing of the tempo map may be done by manual or automatic means until the user and/or the application is satisfied that valid data has been created. Once the user is satisfied with the integrity of the timing track and its tempo map, and chooses to approve the tempo map at step 275, the music application may store the tempo map as proprietary data in the musical enhancement file at step 285.

Next, at step 300, the music application may prompt the user to create a new musical enhancement, edit an existing musical enhancement, or exit the creation process. If the user indeed chooses to create a new musical enhancement at step 300 (e.g., by clicking on an appropriately labeled icon), the music application may prompt the user, at step 305, to choose the type of enhancement to be created.

The types of musical enhancements that the music application offers the user to create at step 305 may include, but are not limited to, melodic, chordal, lyrical, rhythmical, instrumental, etc. In a preferred embodiment, the music application may suggest a particular order that the user should follow when deciding which type of enhancement to create next at step 305. These enhancements may be created using user input devices 130, musical input devices 140, music servers 160 via computer network 150 (FIG. 1), or any of the other resources that may be available to the music application. Enhancements containing MIDI information are created in synchronicity with the recorded performance's audio signal by being temporally linked with the MIDI information of the tempo map, which may serve as the rhythmic framework for the musical enhancements and the enhancement file as a whole. Enhancements containing digital audio and/or video signal information are created in synchronicity with the recorded performance's audio signal by being temporally linked with the performance via time codes.

Once the user decides, at step 305, which type of enhancement is to be created, the music application may prompt the user depending on the type of enhancement chosen. As it is preferred in a particular embodiment, if the user first chooses to create a melodic enhancement at step 305 (e.g., by clicking on an appropriately labeled icon), the music application may prompt the user at step 310 to input MIDI information that is associated with a melody of the recorded performance's audio signal and that is temporally associated with the tempo map. There are many ways in which this may be facilitated by the music application. For example, the music application may playback the digital audio track of the recorded performance so that the user may play-along with a MIDI instrument via musical input device 140 (FIG. 1). Alternatively, the user may play-along by typing MIDI commands with a keyboard via user input device 130 (FIG. 1) into a musical staff that is temporally associated with the tempo map and displayed by visual display device 180 (FIG. 1), for example.

At step 330, the music application may then prompt the user to approve, edit, or redo the musical enhancement (e.g., the melodic enhancement, if the user created a melodic enhancement). If the user chooses to redo the enhancement at step 330, the music application may return to step 305. If the user chooses to edit the enhancement at step 330, various editing facilities (described in more detail below) may be provided by the music application at step 340 which allow the user to correct or refine the enhancement. For example, specialized aural playback facilities of the music application, via aural speaker devices 170 (FIG. 1), allow repetitive playback and/or playback at reduced tempos of selected segments of the enhancement and/or the temporally linked recorded performance's audio signal as a means to expedite refinement or correction of the enhancement. Furthermore, specialized visual playback facilities of the music application, via visual display device 180 (FIG. 1), allow the enhancement to be displayed during playback in different ways, such as in a musical staff or event list, for example. Once the user is satisfied with the enhancement and chooses to approve it at step 330, the music application may store the enhancement as a new enhancement track in the musical enhancement file at step 345, and may then return to step 300.

Alternatively, or in addition to creating a melodic enhancement, the user can create a lyrical enhancement at step 305 (e.g., by clicking on an appropriately labeled icon). If the user chooses to create a lyrical enhancement, the music application may prompt the user at step 315 to input text information that is associated with lyrics of the recorded performance's audio signal and whose syllables are temporally associated with notes of the melodic enhancement (if one has already been created). There are many ways in which this may be facilitated by the music application. For example, the music application may prompt the user to type text information with a keyboard via user input device 130 (FIG. 1) into a text entry field displayed by video signal output device 180 (FIG. 1), or load a text file from a lyric web site via computer network 160 (FIG. 1), and then to assign each syllable in the entered text to a note or notes of the melodic enhancement. If no melodic enhancement exists, the music application may prompt the user to tap out melodic beats, via devices 130 and/or 140 (FIG. 1), for example, in accordance with the sounding of each of the lyric's syllables in the recorded performance's audio signal as it progresses from beginning to end, and then to assign each syllable in the entered text to those beats. The music application may also provide the user with facilities for the parsing of the text to assist in linking its syllabic content to events of the melodic enhancement or to tapped out melodic beats.

At step 330, the music application may then prompt the user to approve, edit, or redo the musical enhancement (e.g., the lyrical enhancement, if the user created a lyrical enhancement). If the user chooses to redo the enhancement at step 330, the music application may return to step 305. If the user chooses to edit the enhancement at step 330, various editing facilities (described in more detail below) may be provided by the music application at step 340 which allow the user to correct or refine the enhancement. For example, aural playback facilities of the music application, via aural speaker devices 170 (FIG. 1), allow repetitive playback and/or playback at reduced tempos of selected segments of the enhancement and/or the temporally linked melodic enhancement and/or the temporally linked recorded performance's audio signal as a means to expedite refinement or correction of the enhancement. Furthermore, visual playback facilities of the music application, via visual display devices 180 (FIG. 1), allow the enhancement to be displayed during playback in different ways, such as in a string of syllables that are synchronously highlighted and vertically aligned with the selected note or notes of the melodic enhancement, for example. Once the user is satisfied with the enhancement and chooses to approve it at step 330, the music application may store the enhancement as a new enhancement track in the musical enhancement file at step 345, and may then return to step 300.

Alternatively, or in addition to creating other enhancements, the user can create a chordal enhancement at step 305 (e.g., by clicking on an appropriately labeled icon). If the user chooses to create a chordal enhancement, the music application may prompt the user at step 320 to input MIDI information that is associated with a harmony or chording of the recorded performance's audio signal and that is temporally associated with the tempo map and notes of the melodic enhancement (if one has already been created). There are many ways in which this may be facilitated by the music application. For example, the music application may playback the digital audio track of the recorded performance so that the user may play-along with a MIDI instrument via musical input device 140 (FIG. 1). Alternatively, the user may play-along by typing MIDI commands with a keyboard via user input device 130 (FIG. 1) into a musical staff that is temporally associated with the tempo map and displayed by visual display device 180 (FIG. 1). The music application may also provide the user with conventional notation facilities including, but not limited to, chord shape blocks, tablature ("tab"), or alphanumeric presentations. These notations may be retrieved by the music application from a database of chord information, via storage device 120 (FIG. 1) or a web site via computer network 150 (FIG. 1), for example, and may be placed in the enhancement's visual presentation automatically or via user input device 130 (FIG. 1), for example. The music application may also allow modifications or addenda to the database, which may be input via user input device 130 (FIG. 1) or by an instrument via musical input device 140 (FIG. 1), for example, at the user's discretion. For instance, rhythmic symbols may be added to the display capabilities of this enhancement to show a particular strumming technique, emphasis, and/or sustain for each chord.

At step 330, the music application may then prompt the user to approve, edit, or redo the musical enhancement (e.g., the chordal enhancement, if the user created a chordal enhancement). If the user chooses to redo the enhancement at step 330, the music application may return to step 305. If the user chooses to edit the enhancement at step 330, various editing facilities (described in more detail below) may be provided by the music application at step 340 which allow the user to correct or refine the enhancement. For example, aural playback facilities of the music application, via aural speaker devices 170 (FIG. 1), allow repetitive playback and/or playback at reduced tempos of selected segments of the enhancement and/or the temporally linked recorded performance's audio signal and/or the temporally linked melodic enhancement (if one has already been created) as a means to expedite refinement or correction of the enhancement. Furthermore, visual playback facilities of the music application, via visual display device 180 (FIG. 1), allow the enhancement to be displayed during playback in different ways, such as in a string of chord notations that are synchronously highlighted and vertically aligned with the correct note or beat in the melodic enhancement or tempo map, for example. Once the user is satisfied with the enhancement and chooses to approve it at step 330, the music application may store the enhancement as a new enhancement track in the musical enhancement file at step 345, and may then return to step 300.

Alternatively, or in addition to creating the other enhancements, the user can choose to create one of the many other types of enhancements not already mentioned at step 305 (e.g., by clicking on an appropriately labeled icon). If the user chooses to create an other type of MIDI information enhancement, the music application may prompt the user at step 325 to input, via musical input device 140 or computer network 150 (FIG. 1), for example, MIDI information that is associated with any instrumentation, such as drums or bass, or any other type of musical information that is a part of, or a creative addendum to, the recorded performance's audio signal and that is temporally associated with the tempo map. As described above, at step 330, the music application may then prompt the user to approve, edit, or redo the newly created musical enhancement. Once the user is satisfied with the enhancement and chooses to approve it at step 330, the music application may store the MIDI enhancement as a new enhancement track in the musical enhancement file at step 345, and may then return to step 300.

Alternatively, or in addition to creating an other type of MIDI information enhancement, the user may be prompted at step 325 to input audio and/or video signal information that is synchronized with the recorded performance's audio signal, via musical input device 140 or computer network 150 (FIG. 1), for example. Video representations of guitar or piano fingering and/or audio representations of alternate accompaniment materials are among the enhancements possible in this approach. Again, the user may be prompted at step 330 to approve, edit, or redo the newly created musical enhancement. Once the user is satisfied with the enhancement and chooses to approve it at step 330, the music application may store the audio and/or video signal enhancement as a new enhancement track in the musical enhancement file at step 345, and may then return to step 300.

It is to be understood that any of the enhancement tracks may be created automatically by the music application through analysis of the recorded performance's signal, for example. It is also to be understood that each enhancement may be saved in one or more enhancement file and that an enhancement file may contain links to other enhancement files and other enhancements, for example.

When the user is done creating all the desired enhancements, which may contain standard MIDI components, audio and/or video signals, as well as other proprietary data, and the user chooses to exit the enhancement creation process at step 300 (e.g., by clicking on an icon labeled "exit"), the music application may save the musical enhancement file (including the timing track, tempo map, any existing enhancement tracks, and the digital audio track of the recorded performance itself if desired and in agreement with copyright laws) at step 350 and then return to step 205. The musical enhancement file may include all the aural and visual enhancements created by the user or time-coded linkages thereto and is sufficient to reconstitute the enhancements when loaded by a user in the music application, whether or not the user, or the file itself, is in possession of the audio signal of the recorded performance for which the musical enhancement file was created to enhance. When it is desired to use the music application without the recorded performance's audio signal, the enhancements may act as animated sheet music that does not require page turning and that may prompt the user to play-along at a chosen tempo and pitch, for example. When used with the recorded performance's audio signal, not only may the user be prompted to play-along at a chosen tempo and pitch with this visual and aural animated sheet music, but he or she is also able to hear in synchronicity the original performance played at the chosen tempo and pitch. The music application may enable and encourage the creator of a musical enhancement file to add his or her work to a library of works that may, for example, be located on a website using automated web publishing and iBook technology as referred to above.

When the user desires to edit and/or playback an existing musical enhancement file, the user may select the appropriate button or option from the music application. For example, the music application, at step 205, may also prompt the user to load an existing musical enhancement file (e.g., by clicking on an icon labeled "load enhancement file"). The music application may then prompt the user at step 355 (FIG. 2) to select and load a specific musical enhancement file from those available on a local storage device or a remote web site via computer network 150 (FIG. 1), for example. After the musical enhancement file has been loaded, preferably by means of an auto-load function, the music application may prompt the user at step 360 (FIG. 2) to load the audio signal of the recorded performance that the loaded file enhances. The user may choose to complete this step if the user rightfully possesses the correct audio signal and desires for it to be played-back in synchronicity with the enhancement file. The loading of the recorded performance may be accomplished in a manner similar to step 210 described above. Alternatively, step 360 (FIG. 2) may be completed automatically by the music application. After step 360 (FIG. 2), the music application may initialize a verification routine at step 365 to assess the contents of the loaded audio signal. This verification may be accomplished using established CD database referral techniques or other suitable methods, the results of which may render the recorded performance's audio signal, title, and other linked information available for the user to use with the loaded musical enhancement file. If the user does not rightfully possess the correct audio signal, the music application may prompt the user with an offer to purchase it, for example, through an affiliated web site via computer network 150 and music server 160 (FIG. 1). If the audio signal is purchased in this manner, the music application may load the audio signal and then combine it with the enhancement file to make it ready for playback in synchronicity with the enhancements. Furthermore, the music application may modify the audio signal to include a unique reference that may identify the original purchaser in case of an abuse of the performance's copyright. In addition, if necessary, the music application may modify and/or compress/decompress the recorded performance's audio signal at step 370 (FIG. 2) in order to optimize its suitability for further processes and synchronize the audio signal with the enhancements of the loaded musical enhancement file, preferably automatically and similarly (at least in part) to step 215.

Next, at step 375 (FIG. 2), the music application may prompt the user either to playback the enhancement file or to edit it. If the user chooses to edit the enhancement file at step 375, the music application may return to step 275, from which point the user may choose to edit any portion of the enhancement file. If the user chooses to playback the enhancement file at step 375 (FIG. 2), a number of various options may be presented at step 380 (FIG. 2) which allow the user to choose in what way or ways any or all of the enhancements are to be presented and played-back in order to meet the user's needs (see, e.g., FIGS. 4/5 and 6). For example, the visual data of a melodic enhancement may be displayed by the music application as notes on a musical staff (e.g., visual pane 475 of FIGS. 4/5 and 6) and/or as piano keys that are struck in accordance with the melody line, either in a user-configurable window or multiple windows of the application's GUI via visual display device 180 (FIG. 1). At the same time, the aural data of this melodic enhancement may be emitted through the music application's aural speaker device 170 (FIG. 1), for example.

Figure 4:
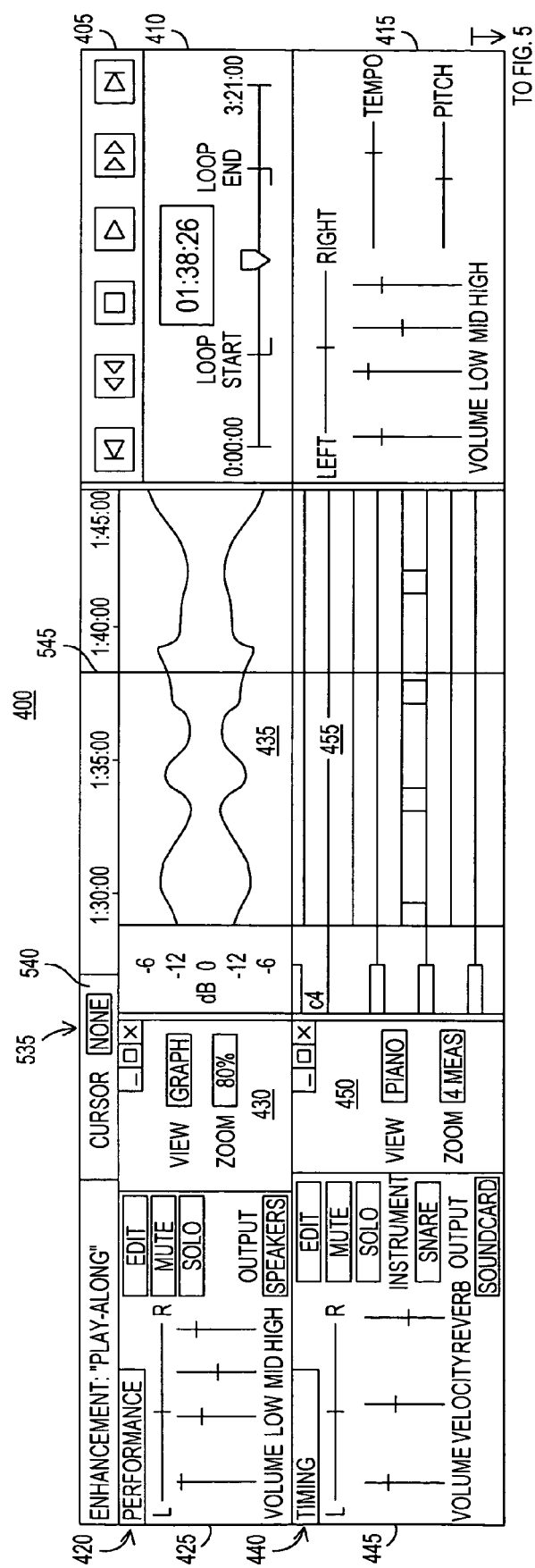
FIGS. 4 and 5 together form an exemplary display screen of a graphical user interface visual display of the music application in accordance with the present invention.
Figure 5:
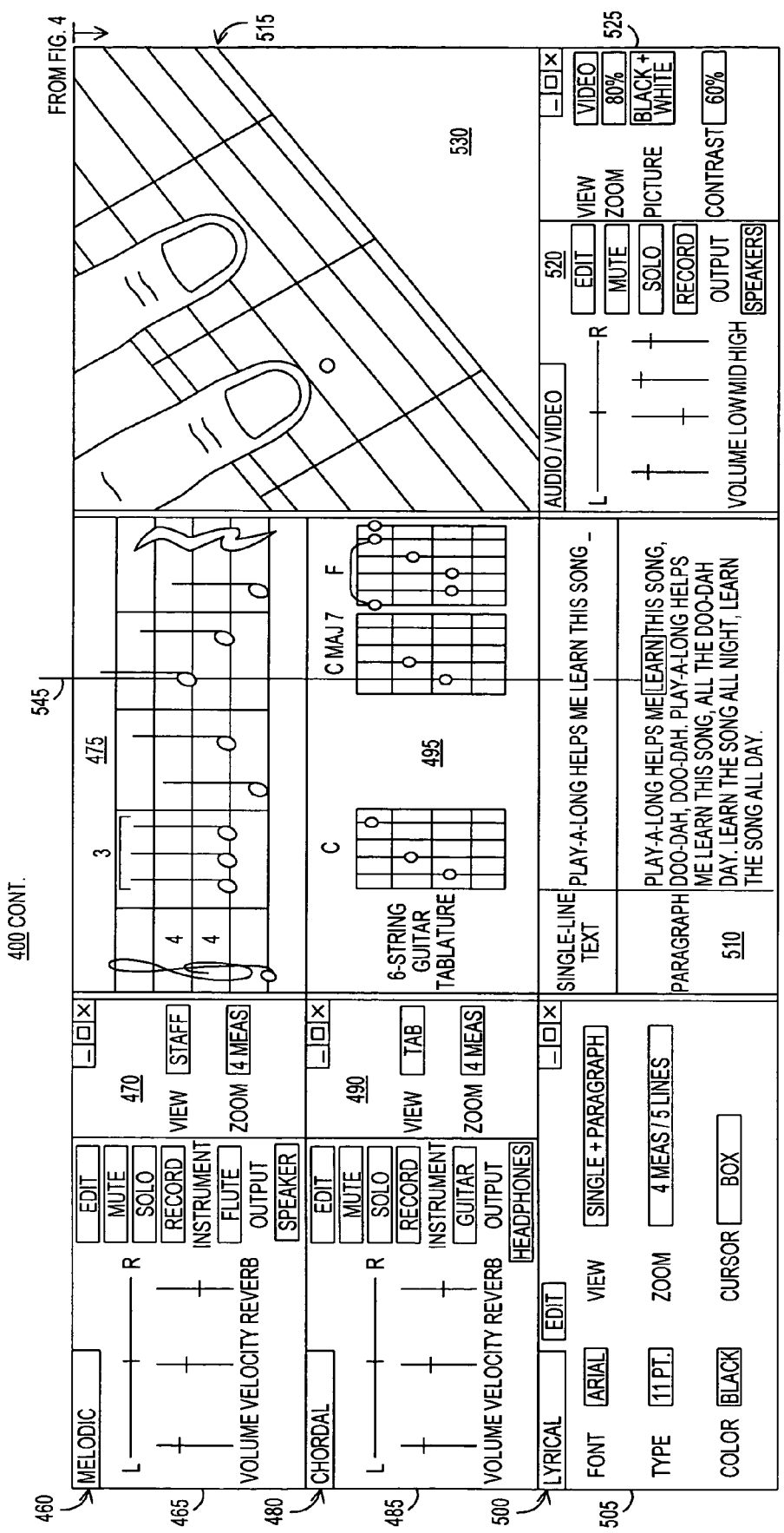

As referred to above, and as illustrated in FIGS. 4 and 5 by an exemplary display screen 400 of the GUI of the music application which may be displayed via visual display device 180 (FIG. 1), the user may be provided with a number of various tools to assist in the playback and/or editing of the enhancement file.

Display screen 400 may include control tool 405, much like those found on common tape player transports, which provides play, rewind, fast-forward, and other functions to facilitate playback positioning for efficient use in editing and/or playing-along to the enhancement file. This may allow the user to quickly jump to, replay, or play-along with favorite portions of a performance and its enhancements.

Display screen 400 may also include looping tool 410 that allows the user to automatically repeat a user-selectable range of the performance and/or its enhancement file. This may render a particularly difficult portion of a recorded performance easier to understand by allowing the user to repeatedly hear and/or see it and its enhancements for the purpose of helping him or her attain performance proficiency, for example.

Display screen 400 may also include output tool 415 that allows the user to increase or decrease the tempo of the musical enhancement file and the recorded performance's audio signal during playback, while at the same time maintaining their original pitch, to facilitate user-analysis of difficult passages or to help the user create new enhancements. By playing-along with a recorded performance and enhancements that gradually speed up, the user may perfect his or her personal performance. Output tool 415 may also allow the user to increase or decrease the pitch of a musical enhancement file and the recorded performance's audio signal during playback, while at the same time maintaining their original tempo. This may enable the user to explore the recorded performance's audio signal in a range more suitable for his or her voice or instrument. Output tool 415 may also provide the user with the ability to adjust various aural characteristics of the overall enhancement file, such as volume, balance, and frequency makeup (e.g., "bass", "mid-range", and "treble" frequencies), for example, during playback.

Separate windows may be provided by the music application and displayed such that the user is able to independently control the aural and visual presentation of the recorded performance and each of its enhancements. For example, recorded performance window 420 may be provided with aural control tool 425, visual control tool 430, and visual pane 435. Aural control tool 425 may include controls similar to those of output tool 415 which allow adjustment to various aural characteristics of the recorded performance's audio signal, such as volume, balance, and frequency makeup for example, during playback of the enhancement file. Aural control tool 425 may also include controls which allow the user to mute or solo the performance during playback of the enhancement file. Moreover, aural control tool 425 may include controls which allow the user to choose the output device through which the performance is to be played back. Visual control tool 430 may include controls which allow the user to choose in which way or ways visual pane 435 displays aspects of the recorded performance. For example, and as illustrated, visual control tool 430 may be adjusted such that visual pane 435 shows a continuous waveform of the performance's amplitude over time. Alternatively or additionally, visual pane 435 may show the makeup of the performance's frequency spectrum, for example. Visual control tool 430 may also provide the user with the ability to adjust the amount of information illustrated by visual pane 435 and the ability to adjust the size and shape of pane 435 and recorded performance window 420, itself.

Timing track window 440 may also be provided by the music application. Timing track window 440 may include aural control tool 445, visual control tool 450, and visual pane 455. Aural control tool 445 may include controls which allow adjustment to various aural characteristics of the timing track's MIDI information, such as volume, balance, velocity, and reverb, for example, during playback of the enhancement file. Aural control tool 445 may also include controls which allow the user to mute or solo the timing track and/or record additional MIDI information therein during playback of the enhancement file. Moreover, aural control tool 445 may include controls which allow the user to choose the output device to which the timing track's MIDI information is communicated during playback. Visual control tool 450 may include controls which allow the user to choose in which way or ways visual pane 455 displays aspects of the timing track. For example, and as illustrated, visual control tool 450 may be adjusted such that visual pane 455 shows a piano roll of the timing track's MIDI information. Alternatively or additionally, visual pane 455 may show an event list of the information, for example. Visual control tool 450 may also provide the user with the ability to adjust the amount of information illustrated by visual pane 455 and the ability to adjust the size and shape of pane 455 and timing track window 440, itself.

Melodic enhancement window 460 may also be provided by the music application. Melodic enhancement window 460 may include aural control tool 465, visual control tool 470, and visual pane 475. Aural control tool 465 may include controls, similar to those of aural control tool 445, which allow adjustment to various aural characteristics of the melodic enhancement track's MIDI information during playback of the enhancement file. Aural control tool 465 may also include controls which allow the user to mute or solo the melodic enhancement and/or record additional MIDI information therein during playback of the enhancement file. Moreover, like aural control tool 445, aural control tool 465 may include controls which allow the user to choose the output device to which the melodic enhancement's MIDI information is communicated during playback. Visual control tool 470 may include controls, similar to those of visual control tools 430 and 450, which allow the user to choose in which way or ways visual pane 475 displays aspects of the melodic enhancement. For example, and as illustrated, visual control tool 470 may be adjusted such that visual pane 475 shows a musical staff of the melodic enhancement's MIDI information. Alternatively or additionally, visual pane 475 may show a piano roll of the information, for example. Like tools 430 and 450, visual control tool 470 may also provide the user with the ability to adjust the amount of information illustrated by visual pane 475 and the ability to adjust the size and shape of pane 475 and melodic enhancement window 460, itself.

Chordal enhancement window 480 may also be provided by the music application. Chordal enhancement window 480 may include aural control tool 485, visual control tool 490, and visual pane 495. Aural control tool 485 may include controls, similar to those of aural control tools 445 and 465, which allow adjustment to various aural characteristics of the chordal enhancement track's MIDI information during playback of the enhancement file. Aural control tool 485 may also include controls which allow the user to mute or solo the chordal enhancement and/or record additional MIDI information therein during playback of the enhancement file. Moreover, like aural control tools 445 and 465, aural control tool 485 may include controls which allow the user to choose the output device to which the chordal enhancement's MIDI information is communicated during playback. Visual control tool 490 may include controls, similar to those of visual control tools 430, 450, and 470, which allow the user to choose in which way or ways visual pane 495 displays aspects of the chordal enhancement. For example, and as illustrated, visual control tool 490 may be adjusted such that visual pane 495 shows tablature notation for a 6-string guitar of the chordal enhancement's MIDI information. Alternatively or additionally, visual pane 495 may show a musical staff of the information, for example. Like tools 430, 450, and 470, visual control tool 490 may also provide the user with the ability to adjust the amount of information illustrated by visual pane 495 and the ability to adjust the size and shape of pane 495 and chordal enhancement window 480, itself.

Lyrical enhancement window 500 may also be provided by the music application. Lyrical enhancement window 500 may include visual control tool 505, and visual pane 510. Visual control tool 505 may include controls, similar to those of visual control tools 430, 450, 470, and 490, which allow the user to choose in which way or ways visual pane 510 displays aspects of the lyrical enhancement. For example, and as illustrated, visual control tool 505 may be adjusted such that visual pane 510 shows both a single-line text field for displaying the lyrical text that is temporally linked to the portions of the other tracks that are displayed in visual panes 435, 455, 475, and 495, for example, and a multiple-line text field for displaying one or more stanzas of the lyrical text while boxing the syllable being played back, for example. Alternatively, visual pane 510 may show just one parsed word of the lyrical text at a time. Visual control tool 505 may also include controls which allow adjustment to various visual characteristics of the lyrical enhancement track's text information during playback of the enhancement file, such as font, type size, and color, for example. Like visual control tools 430, 450, 470, and 490, visual control tool 505 may also provide the user with the ability to adjust the amount of information illustrated by visual pane 510 and the ability to adjust the size and shape of pane 510 and lyrical enhancement window 500, itself.

Audio/video signal enhancement window 515 may also be provided by the music application. Audio/video signal enhancement window 515 may include aural control tool 520, visual control tool 525, and visual pane 530. Aural control tool 520 may include controls similar to those of aural control tool 425, which allow adjustment to various aural characteristics of the audio/video signal during playback of the enhancement file. Aural control tool 520 may also include controls which allow the user to mute or solo the audio/video signal enhancement and/or record additional audio and/or video signal information thereover during playback of the enhancement file. Moreover, like aural control tools 445, 465, and 485, aural control tool 520 may include controls which allow the user to choose the output device to which the audio/video enhancement's audio signal information is communicated during playback. Visual control tool 525 may include controls, similar to those of visual control tools 430, 450, 470, and 490, which allow the user to choose in which way or ways visual pane 530 displays aspects of the audio/video enhancement. For example, and as illustrated, visual control tool 525 may be adjusted such that visual pane 530 just shows the video signal information of the audio/video enhancement. Alternatively, instead of displaying video signal information, visual pane 530 may just show a continuous waveform of the amplitude of the audio signal of the audio/video enhancement over time, for example. Visual control tool 525 may also include controls which allow adjustment to various visual characteristics of the audio/video enhancement's video signal information during playback of the enhancement file, such as picture color, contrast, and resolution, for example. Like visual control tools 430, 450, 470, and 490, visual control tool 525 may also provide the user with the ability to adjust the amount of information illustrated by visual pane 530 and the ability to adjust the size and shape of pane 530 and audio/video signal enhancement window 515, itself.

Cursor window 535 may also be provided by the music application. Cursor window 535 may include visual control tool 540 and cursor 545. Preferably, cursor 545 sweeps horizontally across each of the vertically aligned track windows 420, 440, 460, 480, and 500, while highlighting the portion of information in its pane to be played-along at that particular moment during playback of the enhancement file. Visual control tool 540 may include controls which allow the user to choose in which way or ways cursor 545 visually indicates which portion of each of the displayed file's tracks are to be played back at that particular moment. For example, and as illustrated, visual control tool 540 may be adjusted such that cursor 545 simply crosses each of the panes of the enhancement file without altering the display of the information. Alternatively, cursor 545 may highlight in yellow the information in each visual pane that is to be played back at that particular moment, for example.

Therefore, the music application is able to simultaneously present multiple temporally linked enhancements, while having each enhancement's aural data emitted at different volumes through different devices, such as aural speaker devices 170 (FIG. 1), for example. These features of the music application of the present invention may allow a band or orchestra to utilize an enhancement file that contains enhancement tracks, such as animated sheet music, for each instrument found in that band or orchestra, for example. The entire group may be able to view visual components of all the file's enhancements on one large display, while each member of the group may selectively listen only to the aural component and view only the visual component of their particular instrument's enhancement via headphones and a personal video screen, respectively.

The music application may also provide the user with a "zoom playback" tool which allows for customizable selection and sizing of display windows and their contents. For example, a user may wish to see a melodic enhancement for certain sections of the performance, and have the chordal enhancement shown for other sections of the performance during playback of the enhancement file.

As yet another example, the music application may provide chord study tools to allow linking (e.g., via the web) of a chordal enhancement's existing information to a central database of chord shapes, fingerings, and/or alternate tunings. This database, which can be constantly updated by various users as they discover different ways to play a particular chord, allows a particular user to choose amongst the countless ways in which a particular performance's chording may be accomplished. For example, depending upon the manner in which the user tunes his or her instrument, a chordal enhancement's information may be adjusted automatically or by visual control tool 490, for example, in order to show the most simplified way to play each chord for that particular tuning. The same may be said depending on the particular instrument the user plays. For example, if the chordal enhancement was created to show the fingering for a guitar, it may be linked and adjusted automatically or by visual control tool 490, for example, so that the chordal information is displayed by the application for a mandolin, if that is the instrument with which the user wishes to play-along.

Moreover, the music application may prompt the user to play-along with an enhancement file for inputting certain information. The music application of the present invention may store this user-created information and compare it to the information of the enhancements with which the user played-along. Then, tutorial data indicating correctly and incorrectly played notes, for example, may be automatically generated by the music application in order to teach the user how to better play-along with the enhancements, and therefore the recorded performance.

Figure 6:
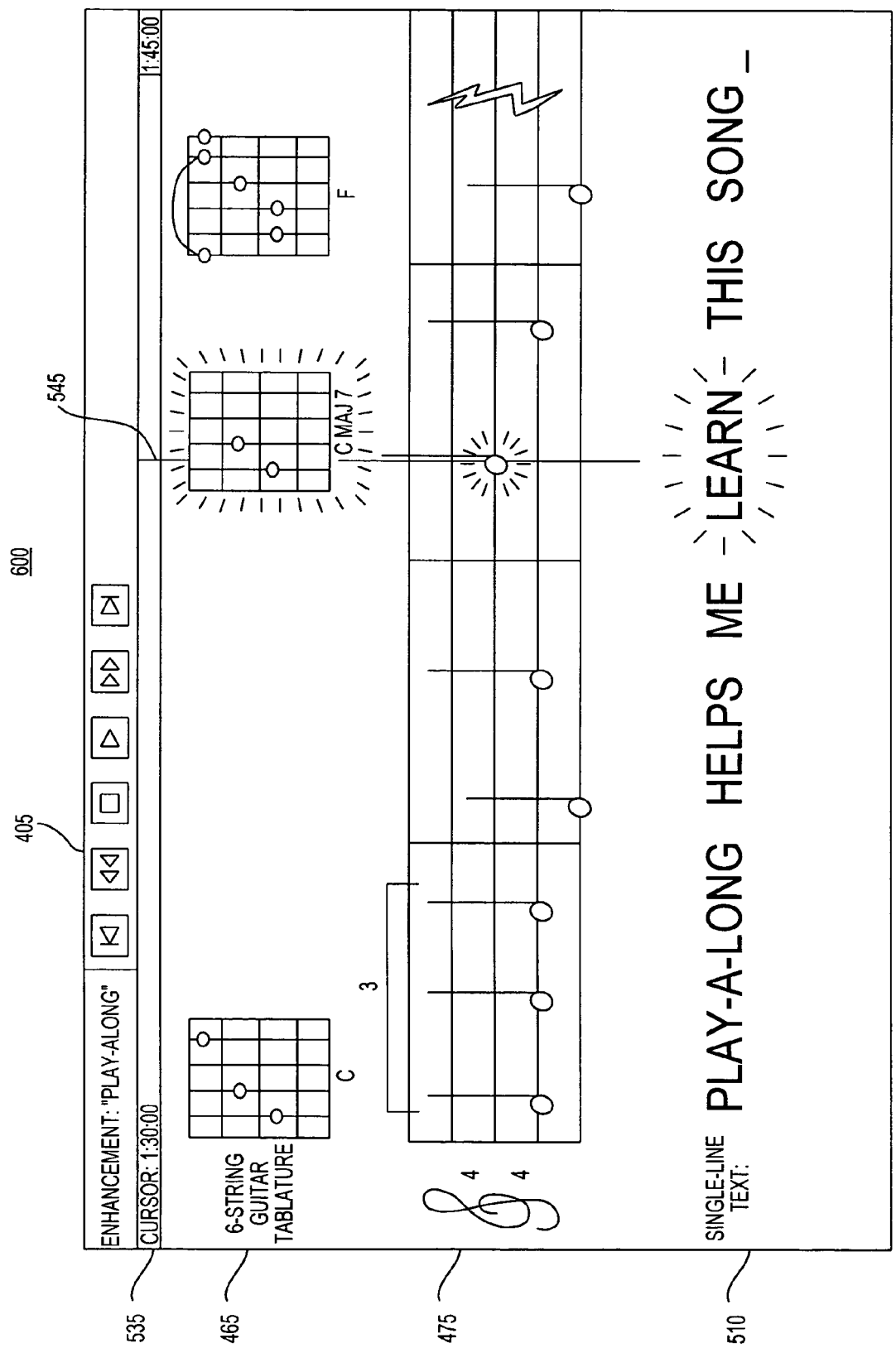
FIG. 6 is a more streamlined display screen of a graphical user interface visual display of the application in accordance with the present invention suitable for playing-along to by a novice user.

FIG. 6 shows a more streamlined display screen 600 of the music application of the present invention, which may be displayed via visual display device 180 (FIG. 1) for a user who simply desires to play-along with a recorded performance by singing and/or playing an instrument (e.g., a guitar) while viewing only four measures at a time. The user may configure the music application to display only basic control tool 405, chordal enhancement track's visual pane 495 showing simple fingering for a guitarist, melodic enhancement track's visual pane 475 showing a staff representation of the enhancement's MIDI information, and lyrical enhancement track's visual pane 510 showing only a single-line text field of the enhancement's text information. Also displayed is cursor window 535 and time cursor 545 that sweeps horizontally across the vertically aligned enhancement panes, while highlighting the chord, melodic note, and lyrical syllable to be played-along in synchronicity with the recorded performance at that particular moment during playback of the enhancement file. This simplified and abbreviated display 600 allows a user to concentrate solely on the musical enhancements that they wish to play in synchronicity with the recorded performance, without having to flip the many pages of contemporary sheet music or look in three very separate places for the chording, melody, and lyrics to a song.

The screens shown in FIGS. 4-6 are merely illustrative. Any other suitable menus, options, control tools, visual panes, text boxes, or other content may be provided.

It may be understood that a significantly more basic music application in accordance with the principles of the present invention, while yielding similar benefits to a user, may exist whereby after loading a recorded performance's audio signal, the music application may simply prompt a user to load a scanned copy of the performance's conventional sheet music into a "scanned picture" track of a new musical enhancement file. The music application may then, preferably automatically, stretch or shrink this scanned picture of sheet music and sequence it so that it spans the entire duration of the recorded performance's audio signal. Next, time cursor 545 may be used to sweep horizontally across the scanned sheet music while highlighting the part of the sheet music that corresponds to the recorded performance's audio signal that may be played back simultaneously. While this embodiment of the application does not require the creation of MIDI data enhancements for various instruments and melodies of a performance, and may therefore be easier to use, sheet music is often not entirely accurate and may fail to include notes that are a part of the recorded performance being used.

While the music application of the present invention is described using MIDI protocol for inputting and storing certain user enhancements, it should be understood that any other suitable audio/visual format may be used. For example, it is to be understood that the processes described above and shown in FIGS. 2 and 3 are merely illustrative. Some or all of the steps may be performed depending on the type of performance being enhanced, the types of enhancements a user creates, or the types of enhancements existing in an already created enhancement file. For example, if an enhancement file is to be created including only audio and/or video signal enhancements to a recorded audio signal performance, a user may choose not to create a timing track and tempo map, and the audio/video signal information for each enhancement may be linked to the recorded performance via time codes of the application.

Although the music application of the present invention is described to prompt a user to create, edit, and/or play-along with enhancements in synchronicity with a recorded performance of a familiar song recorded by a familiar artist, it has many other beneficial implementations. For example, a first user may create a new enhancement file that includes enhancements to an original performance that the first user also created. This enhancement file may then be shared with a second user through a particular topic room of interactive web collaboration technology, as described in, for example, Reynolds et al. U.S. patent application Ser. No. 10/439,143, filed May 14, 2003. Then, the second user may add additional audio, video, or MIDI enhancement tracks, such as another instrument or chordal enhancement, for example. These may be the second user's musical interpretation or addition to the first user's enhancement file. In this way, each user may "jam-along" with the other by creating musical enhancements that enhance not only the original performance but also each user's contributions to the performance.

Furthermore, while the music application of the present invention is described as guiding a user through a process of creating, revising, or playing-along with a musical enhancement file that may comprise aural and visual enhancements to a recorded audio performance, it should be understood that any suitable multimedia, such as an audio-visual performance, may be enhanced by an enhancement file. For example, instead of a recorded audio performance, the music application of the present invention may load the signal(s) of a recorded audio-visual performance (e.g., a live concert or play from a DVD) via musical input device 140, for example. Then the music application may prompt a user to follow the steps described above for enhancing not only the audio signal but also the video signal of the recorded performance.

For example, if the recorded performance used is the video of a theatrical play, one particular enhancement that a user may desire to create could be an animation showing a floor plan of the stage that tracks the movement of the performers throughout the performance. This would be particularly useful to a director who is interested in using the enhancement to teach the actors, individually or as a group depending on the manner in which the enhancement is displayed, where to be on stage during a particular scene. Furthermore, various users, independently of one another, could provide their own interpretive performances of various characters in a specific play. The application could then combine each performance in synchronicity with one another in order to create a theatrical enhancement of that specific play, such as animation, using the actors' voices to accompany it, for example. Furthermore, any phrase by any actor can be programmed to be triggered by a triggering phrase by another actor, or by a combination or sequence of such phrases by one or more actors.

Thus it is seen that a music application for guiding a user through the steps of creating, editing, and playing back enhancements to a recorded performance of an original artist has been provided. It should be noted that the types of created enhancements, along with their sizes, formats, and quantity, as described above, are only exemplary. One skilled in the art will appreciate that the present invention can be practiced by other than the described embodiments, which are presented for purposes of illustration and not of limitation, and the present invention is limited only by the claims which follow.

What is claimed is:

1. A method of guiding a user through a music application for enhancing a performance signal, comprising:
    prompting the user to store the performance signal in a performance track of the music application;
    prompting the user to store information in accordance with the tempo of the contents of the performance track in a tempo track of the music application;
    prompting the user to store enhancement data that is both associated with the contents of the performance track and temporally linked to the contents of the tempo track in at least a first enhancement track of the music application; and
    prompting the user to save the contents of the tempo track and the contents of at least the first enhancement track as an enhancement file.

2. The method defined in claim 1 further comprising:
    prompting the user to save the contents of the performance track as a part of the enhancement file.

3. The method defined in claim 1, wherein the contents of the performance track is not saved as a part of the enhancement file.

4. The method defined in claim 1, wherein the performance signal is an audio signal.

5. The method defined in claim 1, wherein the performance signal is an audio/video signal.

6. The method defined in claim 1, wherein the enhancement data stored in at least the first enhancement track is MIDI information.

7. The method defined in claim 1, wherein the enhancement data stored in at least the first enhancement track is audio signal information.

8. The method defined in claim 1, wherein the enhancement data stored in at least the first enhancement track is video signal information.

9. The method defined in claim 1, wherein the enhancement data stored in the first enhancement track is associated with lyrics of the contents of the performance track.

10. The method defined in claim 1, wherein the enhancement data stored in the first enhancement track is associated with a harmony of the contents of the performance track.

11. The method defined in claim 1, wherein the enhancement data stored in the first enhancement track is associated with an instrumentation of the contents of the performance track.

12. The method defined in claim 1, wherein the enhancement data stored in the first enhancement track is an addendum to the contents of the performance track as interpreted by the user.

13. The method defined in claim 1, wherein the enhancement data stored in the first enhancement track is associated with a melody of the contents of the performance track.

14. The method defined in claim 13 further comprising:
    prompting the user to store enhancement data that is both associated with lyrics of the contents of the performance track and temporally linked to the contents of the first enhancement track in a second enhancement track of the music application.

15. The method defined in claim 14 further comprising:
    prompting the user to store enhancement data that is both associated with a harmony of the contents of the performance track and temporally linked to the contents of the tempo track in a third enhancement track of the music application.

16. The method defined in claim 15 further comprising:
    prompting the user to store enhancement data that is both associated with an instrumentation of the contents of the performance track and temporally linked to the contents of the tempo track in a fourth enhancement track of the music application.

17. The method defined in claim 16 further comprising:
    prompting the user to store enhancement data that is both an addendum to the contents of the performance track as interpreted by the user and temporally linked to the contents of the tempo track in a fifth enhancement track of the music application.

18. The method defined in claim 1 further comprising:
    prompting the user to selectively play-along with enhancement data stored in the first enhancement track of the enhancement file.

19. The method defined in claim 18, wherein the prompting the user to selectively play-along further comprises:
prompting the user to communicate additional data to the music application that is associated with the contents of at least the first enhancement track.

20. The method defined in claim 19 further comprising:
providing tutorial data to the user, wherein the tutorial data indicates differences between the enhancement data stored in at least the first enhancement track and the additional data.

21. A system for guiding a user through a music application for enhancing a performance signal, the system being configured to:
prompt the user to store the performance signal in a performance track of the music application;
store information in accordance with the tempo of the contents of the performance track in a tempo track of the music application;
prompt the user to store enhancement data that is both associated with the contents of the performance track and temporally linked to the contents of the tempo track in at least a first enhancement track of the music application; and
prompt the user to save the contents of the tempo track and the contents of at least the first enhancement track as an enhancement file.

22. The system of claim 21, wherein the system is further configured to prompt the user to save the contents of the performance track as a part of the enhancement file.

23. The system of claim 21, wherein the contents of the performance track is not saved as a part of the enhancement file.

24. The system of claim 21, wherein the performance signal is an audio signal.

25. The system of claim 21, wherein the performance signal is an audio/video signal.

26. The system of claim 21, wherein the enhancement data stored in at least the first enhancement track is MIDI information.

27. The system of claim 21, wherein the enhancement data stored in at least the first enhancement track is audio signal information.

28. The system of claim 21, wherein the enhancement data stored in at least the first enhancement track is video signal information.

29. The system of claim 21, wherein the enhancement data stored in the first enhancement track is associated with lyrics of the contents of the performance track.

30. The system of claim 21, wherein the enhancement data stored in the first enhancement track is associated with a harmony of the contents of the performance track.

31. The system of claim 21, wherein the enhancement data stored in the first enhancement track is associated with an instrumentation of the contents of the performance track.

32. The system of claim 21, wherein the enhancement data stored in the first enhancement track is an addendum to the contents of the performance track as interpreted by the user.

33. The system of claim 21, wherein the enhancement data stored in the first enhancement track is associated with a melody of the contents of the performance track.

34. The system of claim 33, wherein the system is further configured to:
prompt the user to store enhancement data that is both associated with lyrics of the contents of the performance track and temporally linked to the contents of the first enhancement track in a second enhancement track of the music application.

35. The system of claim 34, wherein the system is further configured to:
prompt the user to store enhancement data that is both associated with a harmony of the contents of the performance track and temporally linked to the contents of the tempo track in a third enhancement track of the music application.

36. The system of claim 35, wherein the system is further configured to:
prompt the user to store enhancement data that is both associated with an instrumentation of the contents of the performance track and temporally linked to the contents of the tempo track in a fourth enhancement track of the music application.

37. The system of claim 36, wherein the system is further configured to:
prompt the user to store enhancement data that is both an addendum to the contents of the performance track as interpreted by the user and temporally linked to the contents of the tempo track in a fifth enhancement track of the music application.

38. The system of claim 21, wherein the system is further configured to:
prompt the user to selectively play-along with enhancement data stored in the first enhancement track of the enhancement file.

39. The system of claim 38, wherein the system is further configured to:
prompt the user to communicate additional data to the music application that is associated with the contents of at least the first enhancement track.

40. The system of claim 39, wherein the system is further configured to:
provide tutorial data to the user, wherein the tutorial data indicates differences between the enhancement data stored in at least the first enhancement track and the additional data.

41. Machine readable media for enhancing a performance signal, the machine readable media comprising program logic recorded thereon for:
prompting the user to store the performance signal in a performance track of the music application;
prompting the user to store information in accordance with the tempo of the contents of the performance track in a tempo track of the music application;
prompting the user to store enhancement data that is both associated with the contents of the performance track and temporally linked to the contents of the tempo track in at least a first enhancement track of the music application; and
prompting the user to save the contents of the tempo track and the contents of at least the first enhancement track as an enhancement file.

42. The machine readable media defined in claim 41, further comprising program logic recorded thereon for prompting the user to save the contents of the performance track as a part of the enhancement file.

43. The machine readable media defined in claim 41, wherein the contents of the performance track is not saved as a part of the enhancement file.

44. The machine readable media defined in claim 41, wherein the performance signal is an audio signal.

45. The machine readable media defined in claim 41, wherein the performance signal is an audio/video signal.

46. The machine readable media defined in claim 41, wherein the enhancement data stored in at least the first enhancement track is MIDI information.

47. The machine readable media defined in claim 41, wherein the enhancement data stored in at least the first enhancement track is audio signal information.

48. The machine readable media defined in claim 41, wherein the enhancement data stored in at least the first enhancement track is video signal information.

49. The machine readable media defined in claim 41, wherein the enhancement data stored in the first enhancement track is associated with lyrics of the contents of the performance track.

50. The machine readable media defined in claim 41, wherein the enhancement data stored in the first enhancement track is associated with a harmony of the contents of the performance track.

51. The machine readable media defined in claim 41, wherein the enhancement data stored in the first enhancement track is associated with an instrumentation of the contents of the performance track.

52. The machine readable media defined in claim 41, wherein the enhancement data stored in the first enhancement track is an addendum to the contents of the performance track as interpreted by the user.

53. The machine readable media defined in claim 41, wherein the enhancement data stored in the first enhancement track is associated with a melody of the contents of the performance track.

54. The machine readable media defined in claim 53, further comprising program logic recorded thereon for prompting the user to store enhancement data that is both associated with lyrics of the contents of the performance track and temporally linked to the contents of the first enhancement track in a second enhancement track of the music application.

55. The machine readable media defined in claim 54, further comprising program logic recorded thereon for prompting the user to store enhancement data that is both associated with a harmony of the contents of the performance track and temporally linked to the contents of the tempo track in a third enhancement track of the music application.

56. The machine readable media defined in claim 55, further comprising program logic recorded thereon for prompting the user to store enhancement data that is both associated with an instrumentation of the contents of the performance track and temporally linked to the contents of the tempo track in a fourth enhancement track of the music application.

57. The machine readable media defined in claim 56, further comprising program logic recorded thereon for prompting the user to store enhancement data that is both an addendum to the contents of the performance track as interpreted by the user and temporally linked to the contents of the tempo track in a fifth enhancement track of the music application.

58. The machine readable media defined in claim 41, further comprising program logic recorded thereon for prompting the user to selectively play-along with enhancement data stored in the first enhancement track of the enhancement file.

59. The machine readable media defined in claim 58, further comprising program logic recorded thereon for prompting the user to communicate additional data to the music application that is associated with the contents of at least the first enhancement track.

60. The machine readable media defined in claim 59, further comprising program logic recorded thereon for providing tutorial data to the user, wherein the tutorial data indicates differences between the enhancement data stored in at least the first enhancement track and the additional data.

\* \* \* \* \*